Dec. 31, 1963 A. L. SELIGSON 3,116,366

CAPACITIVE SOURCE SIGNAL GENERATORS

Filed Aug. 18, 1959

INVENTOR
ARNOLD L. SELIGSON
BY
Robert W. Fiddler
ATTORNEY 3,116,366
Patented Dec. 31, 1963

3,116,366

CAPACITIVE SOURCE SIGNAL GENERATORS

Arnold L. Seligson, 34—41 85th St., Jackson Heights, N.Y.

Filed Aug. 18, 1959, Ser. No. 834,561
5 Claims. (Cl. 179—1)

This invention relates to capacitive reactance signal generators, more particularly to means for coupling such signal generators to standard resistive loads, and at the same time maintaining a flat electrical response.

A variety of situations exist in which the signal source is effective in series with a capacitive reactance, whereby the coupling of the signal source to a standard resistive load or amplifier circuit engenders a variety of problems. Thus, where a capacitor microphone, either crystal or condenser, is to be coupled to a standard amplifier circuit, it is difficult to obtain a flat electrical response through the amplifier. Additionally, to minimize loss of signal intensity, it is necessary to maintain the distance between the signal source and the resistive load or amplifier relatively small.

In order to obtain a flat amplifier response, it has previously been proposed to utilize amplifiers, or cathode followers of large input resistance. Where such amplifiers are employed, however, a high noise level results, and the low frequency response is considerably limited by the largest practical size of input resistor.

With particular reference to audio systems, either of the commercal, or of the home broadcasting and recording types, it is generally difficult to employ condenser microphones without being unduly limited as to the distance of the microphone from the amplifier. Where distance is required between the signal source (microphone) and the amplifier, it has in the past been necessary to provide some amplification equipment arranged in physical conjunction with the microphone, thus providing a relatively bulky device. The relatively large size microphone-amplifier previously employed presented difficulties in that aside from the restricted portability of the microphone, where it is necessary to provide visibility of the speaker as in television programming, the large size microphone tends to hide the speaker's face. Additionally, where it is desired to employ the microphone so that it is not readily perceptible as in "secret interviews," the large size is undesirable. Additionally the large size causes undesirable effects upon the frequency response of the microphone as a result of acoustic diffraction and reflection.

It is with the above problems in mind that the present means have been evolved, means permitting the use of a capacitive reactance signal generator in combination with a resistive load, with a flat electrical response in said resistive load, and a minimal loss of signal intensity, and deterioration of frequency response regardless of the distance between the signal generator and the load. This is accomplished by coupling the capacitive source signal generator to the resistive load in a manner such that the circuit behaves as an integrator over the frequency bands involved.

It is accordingly a primary object of this invention to provide a novel means for coupling capacitive source signal generators to standard resistive loads.

An additional object of this invention is to provide a novel circuit permitting coupling of a capacitive source signal generator to a resistive load, with said resistive load providing a flat electrical response to the signal.

A still further object of the invention is to provide a novel circuit permitting coupling of a capacitive signal generator to a resistance load with a minimum of loss in signal intensity or frequency response such as conventionally occurs due to relatively large spacing between the signal source and the load.

It is also an object of this invention to provide novel means for coupling a capacitance microphone to an amplifier without requiring proximity of the microphone and amplifier, and providing a flat response in the amplifier.

An additional object of the invention is to provide means extending the low and high frequency response in an amplifier coupled to a capacitance microphone.

Another object of the invention is to improve the circuit stability of a capacitive signal generator coupled to a resistive load.

It is also an object of this invention to minimize circuit noise in the amplifier circuit.

A further object of the invention is to provide a circuit coupling a capacitor microphone to an amplifier operating at audio frequencies and possessing a degree of stability comparable to that of 100% feedback devices such as cathode followers, without increasing the noise to signal ratio as is present with these conventional feedback devices.

These, and other objects of the invention, which will become apparent from the following disclosure and claims, are achieved by providing a feed back capacitance between the input and output of a resistive load such as an amplifier to which a signal from a capacitive signal generator is fed such as a condenser microphone with the capacitance connected between points on the load that are 180 degrees out of phase, whereby the response of the resistive load rises as the output of the capacitive signal generator falls, and vice versa.

A primary feature of the invention resides in the fact that by provision of a capacitance between the output and input of a resistive load, between points that are 180 degrees out of phase with each other, a substantially flat electrical response may be obtained over the frequency range of interest.

Another feature of the invention resides in the fact that by the use of the aforementioned capacitance, the physical separation between the capacitive signal generator and the resistive load may be made relatively large without introducing a significant loss of electrical output signal from the signal generator, or a deterioration of frequency response in the resistive load.

An additional feature of the invention resides in the fact that the aforementioned capacitance across the load lowers the actual impedance of the load to reduce noise level, while producing the effect on the signal source of a high virtual input impedance.

The specific structural details of the invention, and their mode of functioning will be made most manifest and particularly pointed out in clear, concise and exact terms in conjunction with the accompanying drawings, wherein.

Figure 1:
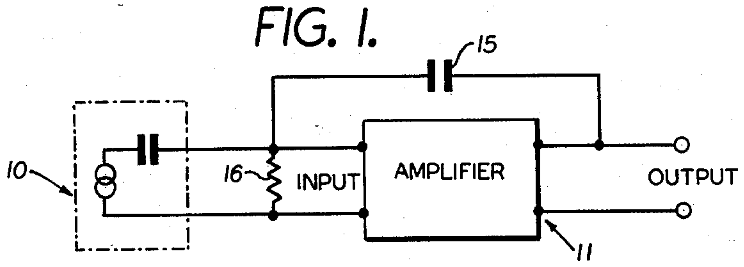
FIG. 1 represents a schematic block diagram showing how the inventive concept may be embodied in conjunction with some standard components shown in block form.

As seen in FIG. 1, a capactive signal generator 10 such as a capacitor microphone is coupled to the input of a resistive load in the form of an amplifier 11. A capacitor 15 is arranged between the output and input of the amplifier as shown in the drawing, with the connection made between points that are 180 degrees out of phase.

Resistor 16 is arranged across the amplifier input terminals.

Figure 2:
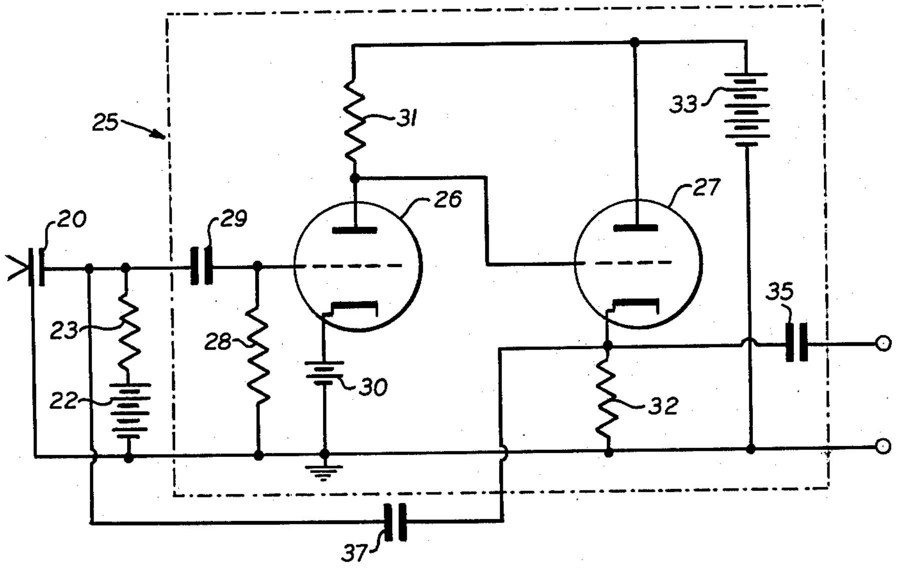
FIG. 2 illustrates a proposed circuit in which a capacitor microphone is coupled to a two stage amplifier.

In the circuit illustrated in FIG. 2, the capacitive source signal generator is illustrated as comprising a capacitor microphone 20 coupled to the input of an amplifier 25 shown enclosed by dot dash lines in FIG. 2. A power supply 22 and polarizing resistor 23 are arranged across the input terminals of the amplifier 25.

Amplifier 25 comprises two triodes 26 and 27. Grid leak resistor 28 is arranged in the grid circuit of triode 26. Condenser 29 is arranged in the grid circuit of triode 26 functioning as a coupling capacitor to prevent the power supply voltage from effecting the grid of triode 26. A bias supply voltage is provided by means of power source 30 arranged in series with the cathode of triode 26. A load resistor 31 is coupled to the plate of triode 26. The output of triode 26 is fed to the grid of second stage triode 27. This second stage triode 27 is coupled to a cathode load resistor 32, and plate power supply 33 is arranged to provide power to the plates of both first stage triode 26 and second stage triode 27. Output coupling capacitor 35 is arranged as shown in the output of the amplifier 25. Feed back capacitor 37 is connected as shown between the second stage cathode and the amplifier input, said capacitor 37 arranged across the amplifier 25 between points that are 180 degrees out of phase.

Figure 3:
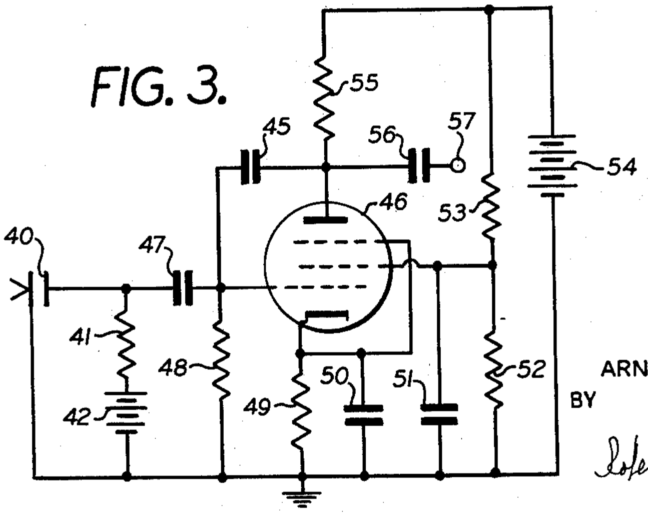
FIG. 3 illustrates a suggested circuit diagram in which a capacitor microphone is coupled to a pentode tube resistive load.

In the FIG. 3 embodiment of the invention a capacitor microphone 40 is shown coupled to a pentode tube circuit forming part of a resistive load such as an amplifier. The pentode circuit is conventional except for application of the feed back capacitor 45 arranged between the plate and the control grid of the pentode 46. A polarizing resistor 41 and power supply 42 are provided across the input to pentode 46 and coupling capacitor 47 is arranged to prevent the voltage of power supply 42 from appearing at the control grid of pentode 46. Grid leak resistor 48 is arranged between the control grid and the ground, and cathode load resistor 49 is provided between the cathode and the ground. Condenser 50 is arranged between the cathode and ground, and screen grid condenser 51 is arranged between the screen grid of pentode 46 and the ground. Screen grid resistor 52 is arranged between the screen grid and the ground, and screen grid resistor 53 is arranged as seen in the drawing to act with screen grid resistor 52 across plate voltage power supply 54. Plate load resistor 55 is arranged in a conventional manner as shown. Output coupling capacitor 56 is arranged in the output line as shown before output terminal 57.

Some suggested parameters for the circuit components shown in FIGS. 2 and 3 are as follows:

| | | |
|---|---|---|
| Resistor **23, 41** | megohms | 100 |
| Power supply **22, 42** | volts | 200 |
| Resistor **28, 48** | megohms | 1–100 |
| Power supply **30** | volts | 2 |
| Resistor **31, 55** | ohms | 20,000–500,000 |
| Power supply **33, 54** | volts | 250 |

The values of the parameters of the feed back condenser 37, 45 are dependent on desired effect as will become hereinafter more apparent.

*Operation*

The aforedescribed circuit arrangements serve to permit coupling of capacitive source signal generators to standard resistive loads without encountering some of the heretofore present limitations on the use of these coupled capacitive source signal generators and resistive loads. Thus a substantially flat electrical response is attainable, and a relatively large physical separation between the signal generator and load may be attained without introducing a significant loss of electrical output signal or deterioration of frequency response.

In its broadest aspects, the instant inventive concept contemplates the provision of a feed back capacitor connected between the load and its input at the point of connection of the signal generator, between points that are 180 degrees out of phase, as best seen in FIG. 1.

In this FIG. 1 illustration, the signal generator 10 shown is a capacitor microphone, and the resistive load is illustrated as amplifier 11. Over the frequency range where the output of the microphone is falling due to its internal capacitance, the amplifier response is rising, where a proper value of feed back capacitor 15 has been chosen. Similarly where the microphone output is flat, the response of the amplifier will be flat since the input resistance will be the same for both the capacitive generator and the feed back circuit comprising resistor 16 and capacitor 15. Depending on the frequency band, the circuit behaves essentially as an integrator, with the midband gain K, low frequency cut off point $f_L$, and high frequency cut off point $f_H$ given by the formulae.

$$K \approx \frac{1}{C_1/C_2 + C_p/C_2K_0}$$

$$f_L = \frac{1}{2\pi R_g(C_p + K_0C_1)}$$

$$f_H = \frac{1}{2\pi \dfrac{R_eC_p}{C_p/C_1 + K_0}}$$

where $C_1$ is the capacitance of the feed back capacitor 15, $C_2$ is the capacitance of the microphone 10, $C_p$ is the capacitance of the cable plus that of the microphone, $R_e$ is the effective output resistance of amplifier 11, and $K_0$ is the gain of amplifier 11.

As is apparent from the formulae, the presence of capacitor 15 introduces into the formulae the factors $C_1$ and $K_0$, etc. which serves to extend the low frequency response, and the high frequency response.

It is thus seen that by making use of the capacitor arranged between the input and output of the resistive load coupled to the capacitive source signal generator, a capactive voltage divider is provided which is relatively non-discriminatory with respect to frequency over a relatively large range. This may be conceived as resulting from the Miller effect produced by the insertion of the capacitor in the circuit so that it lowers the actual impedance level thus reducing noise while the signal generator operates as if it were feeding a high virtual input impedance. The circuit operates at original audio frequencies and possesses a degree of stability comparable only to that of cathode followers or other 100% feed back devices.

The inventive concept may readily be utilized in conjunction with commercial, or home broadcasting or recording work by utilizing appropriate condenser microphones. Thus in the circuits illustrated in FIGS. 2 and 3, the positioning of condensers 37 and 45, respectively, between the input and output of the respective amplifier circuits serves to permit use of a capacitive source signal generator in which the necessary amplification device may be remotely located with respect to the transducer thus permitting formation of a relatively small transducer. This reduction in bulk implements the handling of the microphone, permits its ready obscurement where this is desirable as in the case of television broadcasting, or the like situations where it is undesirable to obscure the talker's face. The inherent improvement in frequency response and signal to noise ratio present in the circuit makes it possible to design phonograph pick ups, eliminating the need for complex RF modulation systems. Utility for the novel circuit arrangements is also found in connection with sound level meter work, electronic stethoscopes, acoustic probes, and commercial public address systems.

The choice of condensers employed to attain the desired feed back and voltage dividing effects determines operational results. Any value of condenser capacitance may be employed depending on the intended purpose. Thus if the capacitance of the feed back condenser is equal to the capacitance of the signal generator, the net circuit gain will be very close to unity, and the frequency response will be extended by a factor equal to the gain of the system before the condenser was introduced into the circuit. As the capacitance of the capacitor increases with respect to signal generator capacitance, the response will be extended by a factor proportional to the reduction of gain of the circuit, and vice versa. Mathematically the circuit value interrelations are expressed in the following formula for the gain of the system:

$$K \approx \frac{-1}{\frac{C_p + G_m R_e C_1}{G_m R_e C_2} + j\left(\frac{\omega^2 C_1 C_p R_g R_e - 1}{\omega C_2 R_g G_m R_e}\right)}$$

where $C_p$ is the total input capacitance (cable tube and microphone-neglecting Miller effect); $G_m R_e$ is the amplifier gain; $R_g$ is the effective grid resistance; $R_e$ is the effective plate resistance; $C_1$ is the capacitance of the condenser 37 or 45 respectively; and $C_2$ is the capacitance of the microphone.

It is thus seen that simple means have been evolved for coupling a capacitive source signal generator to a resistive load whereby a flat electrical response over the frequency range of interest is attained, and whereby a relatively large physical spacing may be provided between the signal generator and resistive load. Additionally, audio frequency may be directly employed without requiring the introduction of complex RF modulation systems.

The above disclosure has been given by way of illustration and elucidation, and not by way of limitation, and it is desired to protect all embodiments of the herein disclosed inventive concept within the scope of the appended claims.

What is claimed is:

1. Electro-acoustic transducing means comprising: capacitor microphone means; amplifying means coupled to said microphone means to receive and amplify an audio frequency signal from said microphone means; polarizing means coupled to the input of said amplifying means; and capacitive means between the input and output of the amplifying means connected to points 180 degrees out of phase with each other to effect capacitive voltage division over the entire frequency range of said microphone means and reduce the actual impedance of said amplifying means and increase its virtual impedance with respect to said microphone means, whereby noise levels are reduced and stability increased.

2. Means as in claim 1 in which said capacitive means have a capacitance equal to that of said microphone means, whereby the net circuits gain will approach unity.

3. Means as in claim 1 in which said capacitive means have a capacitance greater than that of said microphone means, whereby the frequency response will be extended by a factor proportional to the reduction in gain of the circuit without said capacitive means.

4. An electro-acoustic transducer comprising: a capacitor microphone; an amplifier coupled to said microphone to receive an audio frequency signal from said microphone; a polarizing resistor arranged across the input of said amplifier; and a condenser arranged between the input and output of the amplifier across points 180 degrees out of phase with each other to effect capacitive voltage division over the entire frequency range of said microphone and reduce the actual impedance of said amplifying means and increase its virtual impedance with respect to said microphone means, whereby noise levels are reduced and stability increased.

5. Apparatus as in claim 4 in which said condenser has a capacitance in a range equal to or greater than that of said microphone whereby the frequency response will be extended by a factor proportional to the reduction in gain of the circuit without said condenser.

References Cited in the file of this patent

UNITED STATES PATENTS

| | | |
|---|---|---|
| 2,217,275 | Herold | Oct. 8, 1940 |
| 2,226,942 | Pollack | Dec. 31, 1940 |
| 2,285,769 | Forster | June 9, 1942 |
| 2,387,845 | Harry | Oct. 30, 1945 |
| 2,396,691 | Galbreath | Mar. 19, 1946 |
| 2,887,532 | Werner | May 19, 1959 |